United States Patent

[11] 3,594,506

| [72] | Inventors | Benjamin B. Bauer<br>Stamford, Conn.;<br>Emil L. Torick, Darien, Conn.; Richard G. Allen, Pound Ridge, N.Y.; Allen J. Rosenheck, Stamford, Conn. |
|---|---|---|
| [21] | Appl. No. | 717,695 |
| [22] | Filed | Apr. 1, 1968 |
| [45] | Patented | July 20, 1971 |
| [73] | Assignee | Columbia Broadcasting Systems, Inc.<br>New York, N.Y. |

[54] LOUDNESS LEVEL INDICATOR
1 Claim, 6 Drawing Figs.

| [52] | U.S. Cl. | 179/1 P |
|---|---|---|
| [51] | Int. Cl. | G01h 5/00 |
| [50] | Field of Search | 179/1 P, 1.7, 1.8; 73/69; 181/.5; 324/77 A |

[56] References Cited
UNITED STATES PATENTS

| 1,862,458 | 6/1932 | Barstow | 181/0.5 (B) |
| 1,864,527 | 6/1932 | Castner | 181/0.5 (B) |
| 3,031,528 | 4/1962 | Bolston | 181/0.5 (B) |

OTHER REFERENCES

I.E.E.E. TRANSACTION ON AUDIO AND ELECTRO-ACOUSTICS. Vol. AU-14, No. 3, "Researches in Loudness Measurement," Bauer and Torick, September, 1966.

*Primary Examiner*—Kathleen H. Claffy
*Assistant Examiner*—Jon Bradford Leaheey
*Attorney*—Brumbaugh, Free, Graves, Donohue & Raymond

ABSTRACT: As described herein, a loudness level indicator for measuring the loudness levels of broadcast (and other) sounds includes an equalizing network having a transfer characteristic which is the inverse of an equal loudness contour representative of the loudness levels of broadcasting sounds over a selected range of pressure levels. Signals corresponding to the broadcast sounds are equalized by the equalizing network such that sounds of any particular frequency having equal loudnesses are provided as voltage signals having equal amplitudes. These equalized signals are separated by a plurality of filters and the separated signals are then combined linearly by a combining network. A ballistics shaping network shapes the combination signals and supplies the combination signals to an indicating instrument which provides a visual indication of the amplitudes of the combination signals and, accordingly, the loudness levels of the broadcast sounds.

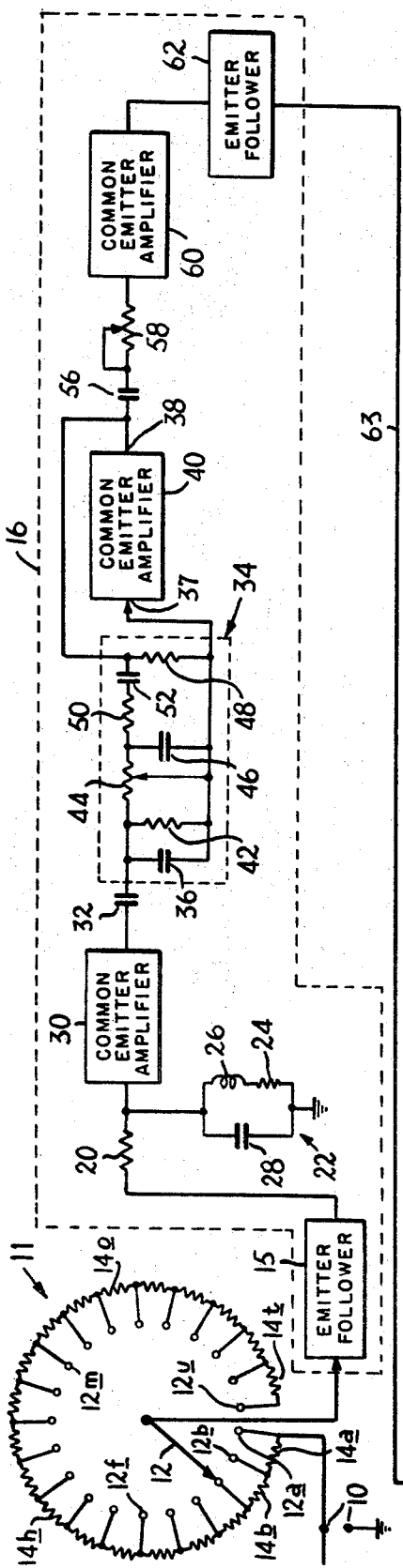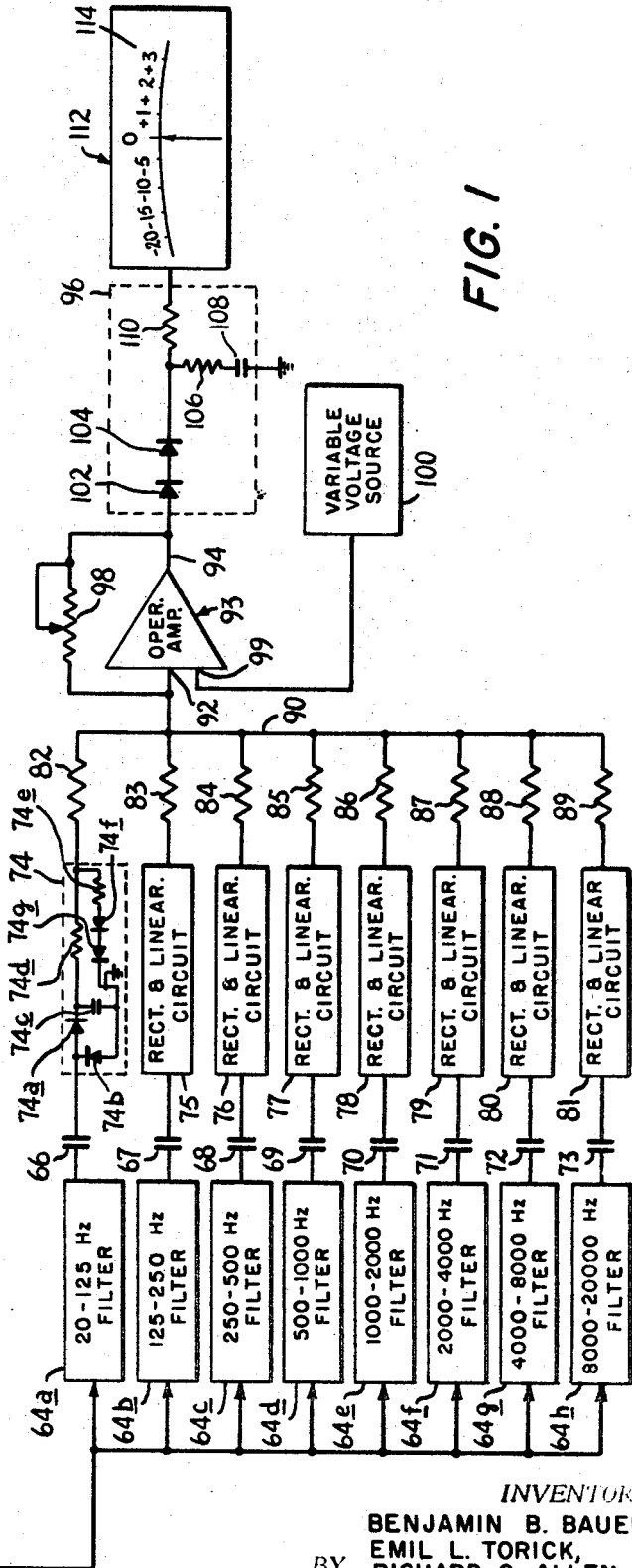
FIG. 1
INVENTORS
BENJAMIN B. BAUER,
EMIL L. TORICK,
RICHARD G. ALLEN &
ALLAN J. ROSENHECK
their ATTORNEYS

FIG. 4

| PULSE LENGTH M.S. | TIME OFF BETWEEN PULSES M.S. | No. of PULSES | RELATIVE LOUDNESS LEVEL |
|---|---|---|---|
| 900 | 00 | 1 | 0 |
| 50 | 00 | 1 | -6.3 |
| 50 | 50 | 2 | -4.3 |
| 50 | 50 | 4-10 | -0.2 to +1.7 dB (+1.0 dB Average) |
| 50 | 100 | 7 | -0.6 |
| 50 | 300 | 3 | -3.6 |
| 50 | 300 | 10 | -3.0 |
| 50 | 600 | 2 | -4.3 |

| SAMPLE | VOLUME UNITS VOLUME INDICATOR | LOUDNESS UNITS LOUDNESS LEVEL INDICATOR | LEVEL ASSESSMENT |
|---|---|---|---|
| 1. Male speech (reference) - Newscast | 0 | 0 | 0 |
| 2. Reverberated Newscast | +1/2 | +1/2 | +1-1/2 |
| 3. Female speech | +1/2 | +1/2 | +1/2 |
| 4. Spinning tires | +1 | +3 | +3-1/2 |
| 5. Harsh music, trumpets | +1/2 | +4 | +5 |
| 6. Music, low-frequency pizzicato passage | +3-1/2 | -2 | -2 |
| 7. Gunshots | +2 | +2 | +1-1/2 |
| 8. Male speech - shouting (1) | +1-1/2 | +3 | +1-1/2 |
| 9. Male speech - shouting (2) | -1 | +1/2 | +1/2 |
| 10. Male speech - excited, rapid delivery | -1/2 | +1 | +1 |
| 11. Male speech (as in 10 but peaked highs, rolled-off lows, compression) | 0 | +2 | +2 |
| 12. Male speech (as in 11, but reverberated) | +1/2 | +2-1/2 | +3-1/2 |
| 13. Male speech (soft, close to microphone) | +1-1/2 | -1-1/2 | -1-1/2 |

RELATIVE LOUDNESS LEVEL OF TYPICAL PROGRAM MATERIAL

FIG. 5

LOUDNESS LEVEL INDICATOR

This invention relates to devices for measuring loudness and, more particularly, to a new and improved loudness level indicator for measuring the loudness level of broadcasting sounds or other sounds.

Loudness is defined in the Acoustical Terminology publication of the American Standards Institute as "the intensive attribute of an auditory sensation, in terms of which sounds may be ordered on a scale extending from soft to loud." Many attempts to measure loudness have been heretofore made. Fundamental to these attempts has been the derivation of "equal loudness contours" which graphically depict the measurement of levels of sound of equal loudness as a function of frequency and intensity. These contours are obtained by loudness balance processes. For example, the classic equal loudness contours of Fletcher and Munson, as described in an article entitled "Loudness, Its Definition, Measurement and Calculation," The Journal of Acoustical Society of America, vol. 5, pp. 81—108, 1933, and the equal loudness contours of Robinson and Dadson, as described in an article appearing in the British Journal of Applied Physics, vol. 7, pp. 166—181, 1956, were obtained by loudness balance processes. As described in these articles, test teams of observers were placed in an anechoic chamber facing the source of sound and alternately subjected to 1,000 Hz. sounds of known pressure levels and to sounds of varying frequencies, the pressure levels of the former sounds being adjusted until they were judged by the observers to be as loud as the latter sounds. The levels of the 1,000 Hz. sounds in db. is called the loudness level of the sound being measured, in "phons." The equal loudness contours of Fletcher and Munson and Robinson and Dadson are of limited utility, however, because the sounds to which the test teams were subjected were obtained in an anechoic chamber, not in a typical living room environment in which one listens to broadcasting sounds, speech and music, or of every day noises.

As more fully described in an article entitled "Calculation of the Loudness of a Complex Noise," The Journal of Acoustical Society of America vol. 28, pp. 807—832, 1956, another set of equal loudness contours were developed by S. S. Stevens. He obtained equal loudness contours for octave bands of white noise, white noise being characterized as having equal average energy per cycle, wherein each member of the test team used earphone receivers and was disposed in a diffused sound field. In an article entitled "Procedure for Calculating Loudness," The Journal of Acoustical Society of America, vol. 33, pp. 1577—1585, 1961, still another set of equal loudness contours were developed by Stevens. These contours formed the basis for his calculation of loudness which will be described more fully hereinbelow.

Finally, another set of equal loudness contours, hereinafter referred to as the Bauer and Torick contours, were illustrated and described in an article entitled "Researches in Loudness Measurement," IEEE Transactions on Audio and Electro-Acoustics, vol. Au-14, No. 3, pp. 141—151, 1966, written by two of the present inventors. These contours were obtained by subjecting test teams composed of women and men, respectively, to octave bands of pink noise, pink noise being characterized as having equal energy distribution per octave band.

The above-described equal loudness contours demonstrated, however, that successive contours above 60 db. i.e., the 60-, 70-, 80- and 90-phon contours, remain relatively constant in shape, notwithstanding the different types of noise to which the test teams were subjected. On this basis, loudness meters have been devised which incorporate a network providing a transfer characteristic opposite, for example, the 70-phon equal loudness contour of Stevens to measure the loudness levels of steady-state octave bands. While valid for steady-state sounds, the loudness level readings provided by these meters are not valid where several frequency bands of noise are heard simultaneously.

The Stevens method for calculating the loudness of distributed frequency noise is described in the above-mentioned article entitled "Calculation of the Loudness of a Complex Noise." According to Stevens the partial loudnesses of the different frequency bands of noise cannot be added directly. This is true because of inhibition, which is the interaction between frequency bands, where a band of noise acting on a patch of nerves diminishes the ability of the adjacent patches of nerves to respond to a second band of noise as effectively as they would have if the first band were not present. Stevens calculation for total loudness $S_T$ is as follows: $S_T = S_m + F(S-S_m)$, where $S_m$ is the loudest frequency band, $F$ is a predetermined fraction and $S$ is the sum of the loudnesses of the frequency bands. For octave bands of noise, $F$ was calculated to be 0.30 and for one-third octave bands, $F$ was calculated to be 0.15. A method for providing direct indications of loudness, in accordance with the teachings of Stevens was described by Bolston in U.S. Pat. No. 3,031,528.

In accordance with the Bolston patent, the sound whose loudness it is desired to measure is picked up with a microphone and the resulting voltage divided with octave band filters. The signal output from each filter, related to sound pressure in its particular band, is applied to a function generator which converts the signals to an exponential function which relates the pressure to the loudness function for each band. The maximum loudness signal appearing in the various frequency bands is detected, and this maximum is combined with all the loudness signals to provide an output reading in accordance with the above-described function $S_T = S_M + 0.3(S-S_M)$. The combined signal is indicated in units of sones to provide a measure of loudness of a complex noise. Bolston's instrumentation of Stevens' theory requires relatively complex circuitry, particularly the nonlinear function generators, and its applicability is limited to the measurement of the loudness of steady-state sounds.

The present invention is directed not to the measurement of loudness, but, rather, the loudness level of sound, which is defined as the sound pressure level of a 1,000 Hz. sound which is judged by a team of observers to be as loud as the given sound whose loudness it is desired to measure. The measurement of loudness level instead of loudness is based on the psychophysical law of combination of loudness levels described in the aforementioned Torick and Bauer article which states, in essence, that the loudness level, in decibels, equals $20 \log (\Sigma P_w 1)$, where the $P_w$'s are linear functions of sound pressures taken in suitable frequency bands and weighted by an inverted equal loudness contour function. In other words, loudness level responds to a law where partial pressures (or voltages corresponding to pressures) are weighted by an inverted equal loudness contour, and arithmetically summed. The conversion to the 20 log function may be simply obtained by measuring the combined voltage on a meter having conventional db. calibration. Thus, by measuring loudness level instead of loudness, the instrumentation is considerably simpler than that of the prior art and provides an accurate indication of the level by which one sound is louder than another sound.

SUMMARY OF THE INVENTION

Accordingly, it is an object of the present invention to provide a loudness level indicator for measuring the loudness levels of broadcasting sounds which overcomes the above-mentioned disadvantages of the prior art.

It is another object of the present invention to provide a loudness level indicator of the above type which embodies a new equal loudness contour accurately depicting the loudness levels of sounds as a function of frequency and intensity.

It is still another object of the present invention to provide a loudness level indicator of the above type which incorporates a network for summing the loudness levels of several frequency bands in a manner accurately representative of the human ear.

It is also another object of the present invention to provide a loudness level indicator of the above type which incorporates a ballistics shaping network to enable the pointer of an indicating instrument to respond to short impulsive sounds in a manner conforming to that of the human ear These and other objects of the present invention are accomplished by a loudness level indicator for monitoring the loudness levels of sounds to which broadcasting and the like signals developed by a pressure responsive transducer or the like are supplied. The indicator comprises a network having a transfer function which is inversely proportional to an equal loudness contour representative of the loudness levels of the sounds as function of frequency and intensity. This network equalizes the signals such that sounds having equal loudnesses are provided as signals having equal amplitudes. Also provided is a filter network for dividing the equalized signals into separate bands. The transmission of the filter sections of this dividing network is such that the sum of the voltages (with constant voltage applied to the network) is also a constant as a function of frequency. This is achieved in the present invention by shaping the transmission of the individual filter sections so that the voltage output is a $cos^1$ or a $sin^2$ function of the frequency ratios. Because of the equalizing network, bands of sound of equal loudness are provided as output voltage signals having equal amplitudes. From the filter network, the equalized signals are supplied to a network wherein the separated signals are arithmetically summed. The combination signal is then supplied to an indicating instrument which provides a visual indication of the amplitude of the combination signal.

In a preferred embodiment of the invention, the separated and equalized signals are linearly rectified before being supplied to the combining network. In addition, a ballistics compensation network is provided between the combining network and the indicating instrument to force the overall ballistic characteristics of the indicator to the correspond to experimentally determined response values of the human hearing process to impulsive sounds.

As a further improvement, in place of the constant transmission characteristic, an adjustable characteristic or an automatic loudness contour shaping circuit can be used to permit readings of loudness level at different portions of the loudness scale.

BRIEF DESCRIPTION OF THE DRAWING

In the Drawing:

FIG. 1 is a schematic block diagram of an illustrative loudness level indicator for measuring the loudness levels of sounds arranged according to the present invention;

FIG. 4 is a table illustrating the loudness level effect of repeated short duration sounds as perceived by a psychoacoustic test team of observers;

FIG. 5 is a table illustrating the loudness levels of various broadcasting sounds as indicated by the loudness level indicator of FIG. 1, as indicated by a conventional volume indicator and as perceived by a psychoacoustic test team of observers.

DESCRIPTION OF THE PREFERRED EMBODIMENT

Figure 2:
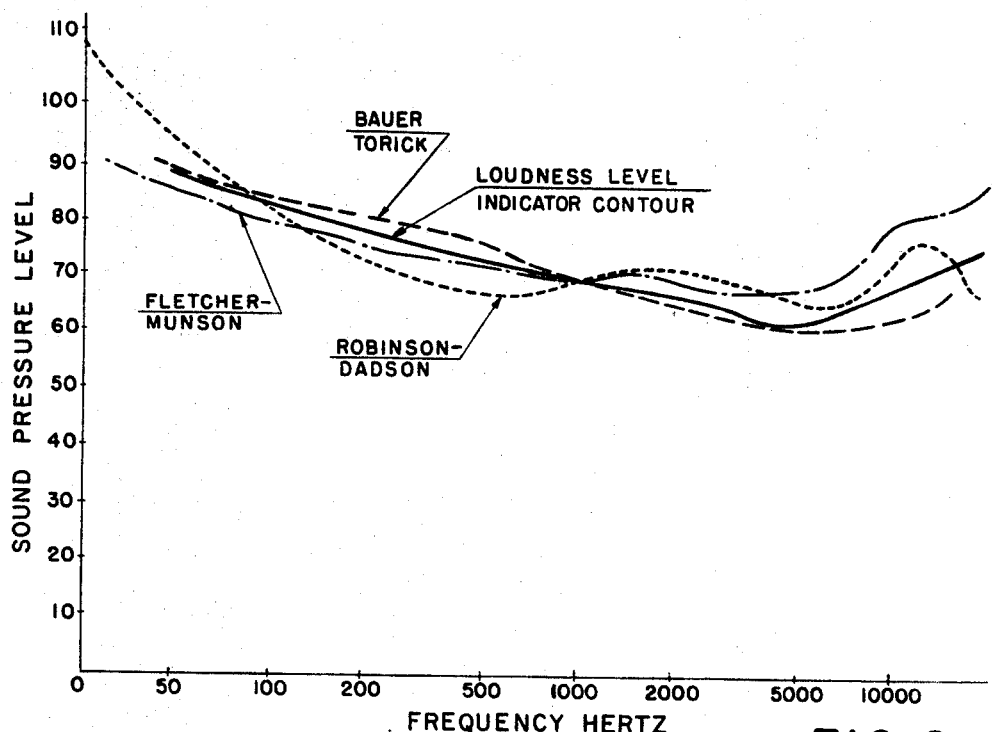
FIG. 2 is a graphic representation in logarithmic coordinatives of the 70-phon equal loudness contours developed by Robinson and Dadson, Fletcher and Munson, Bauer and Torick and the 70-phon equal loudness contour selected for the loudness level indicator of the present invention.

In the illustrative embodiment of a loudness level indicator arranged according to the present invention, as shown in FIG. 1, AC voltage signals corresponding to a broadcast message and derived, for example, by a pressure responsive device, such as a microphone, which produces an AC voltage signal linearly related to the input sound pressure, are applied across a pair of input terminals 10. From the input terminals 10 the signals are supplied to a stepped attenuator circuit 11, the attenuator here shown as a stepped potentiometer. The attenuator circuit 11 includes a center tap 12 which picks off the derived voltage signals from one of a possible 21 tapping points 12a, 12b...12u numbered, in increments of 2 db. −22 db. −20 db...+18 db. respectively. The values of the resistors 14a, 14b...14t of the attenuator progressively diminish from the resistor 14a to the resistor 14t. As can be appreciated, the amount of attenuation may be increased by rotating the center tap 12 in a clockwise direction and may be decreased by rotating the tap in a counterclockwise direction. The mount of attenuation indicated by the attenuator 11 is added to the loudness level indicated by an indicating instrument to provide an accurate indication of the total loudness level of the broadcast message, as will be more fully described below.

From the attenuator 11, the signals are supplied to an emitter follower circuit 15 comprising the first element of a 70-phon equalizing circuit 16. The 70-phon equalizing circuit provides a transfer characteristic shown by a solid line 18 in FIG. 3 which is the inverse of a 70-phon equal loudness contour accurately representative of the loudness levels of broadcasting sounds in the range from about 60 phons to about 80 phons. The 70-phon equal loudness contour is indicated by a solid line in FIG. 2. As above-mentioned, the equal loudness contours of Fletcher-Munson, Robinson and Dadson, Stevens and Bauer and Torick, demonstrate that successive contours about 60 db. remain relatively constant in shape, notwithstanding the different types of noises to which the test teams of observers were subjected. The equalizing circuit 16 provides the transfer characteristic shown in FIG. 3 in order to normalize the signals in the different frequency bands such that bands of signals corresponding to bands of sounds having equal loudnesses are provided as output voltage signals have equal amplitudes.

Referring to FIG. 2, there are graphically represented the 70-phon equal loudness contours of Robinson and Dadson, Fletcher and Munson, Bauer and Torick and the 70-phon equal loudness contour for the loudness level indicator. It can be seen that the 70-phon equal loudness contour of the present invention falls between the Fletcher and Munson 70-phon contour and the Bauer and Torick 70-phon contour. As will be demonstrated below, the 70-phon contour selected for the loudness level indicator of the invention accurately depicts the measurement of levels of broadcasting sounds as a function of frequency for sound pressure levels about 60 db.

Referring again to FIG. 1, from the emitter follower circuit 15, which provides a minimum amount of loading on the output of the attenuator 11, the attenuated signals are coupled through a resistor 20 to a filter network 22. The network 22 includes a resistor 24 in series with an inductor 26 and a capacitor 28 in parallel with the resistor 24 and the inductor 26. The values of the components of the filter network 22 are such that the resonant frequency is about 4 kHz. Typical values for the resistor 24, the inductor 26 and the capacitor 28 are 430 ohms, 75 millihenries and 0.025 microfarads, respectively. Because of the resonance at about 4 kHz. signals having frequencies in the neighborhood of 4 kHz. are emphasized. As is understood in the art, the resistor 24 controls the Q of the resonant circuit and, accordingly, the shape of the frequency response curve at resonance.

From the filter network 22, the partially equalized signals are supplied to the input terminal of a common emitter amplifier 30 which amplifies the voltage signals. The amplified signals are thereupon coupled through a capacitor 32 to a variable bass equalizing circuit 34, here shown as Baxandall tone control circuit. For a detailed description of the Baxandall tone control circuit, reference may be had to an article entitled "Negative Feedback Control" published in Wireless World, page 402, Oct. 1952 and a corrected version of the circuit appearing on page 444 of the Nov. 1952 issue of Wireless World. Briefly, however, the tone circuit 34 comprises a high pass capacitor 36 coupled across the input and output terminals 37 and 38, respectively, of a common emitter amplifier 40 outside the tone control circuit 34. Connected in parallel with the capacitor 36 is a shunt resistor 42 and the center tap of a variable resistor 44 connected in series with the collector output terminal 38 of the amplifier 40. Also coupled in parallel with the resistor 42 are a capacitor 46 and a biasing resistor 48. A resistor 50 and a capacitor 52 are connected in series with the collector output terminal 38, of the amplifier 40 and between the capacitor 46 and the resistor 48.

Figure 3:
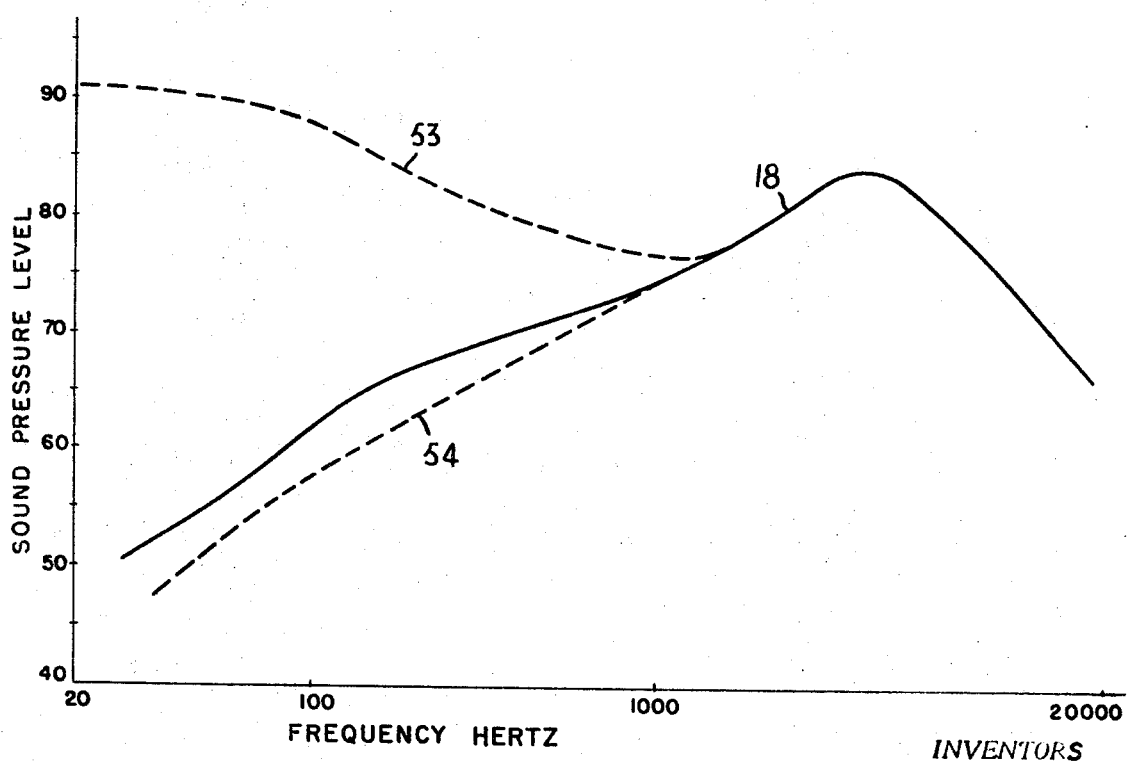
FIG. 3 is a graphic representation in logarithmic coordinates of the transfer characteristic of the 70 phon equalizing circuit of the loudness level indicator.

By the proper selection of the values of the components of the tone control circuit 34, a balance may be realized at the base input terminal 37 of the amplifier 40 between the high pass signals supplied from the amplifier 30 through the capacitor 32 and the high pass inverted feedback signals supplied from the collector output terminal 38 of the amplifier 40. As is understood in the art, the amplifier 40 must and does provide sufficient gain to operate the feedback tone control. The desired bass or low frequency contour may be obtained by suitable adjustment of the variable resistor 44. The adjustment range of the tone control circuit 34 for low frequencies is shown in FIG. 3 and is represented by a pair of dashed lines 53 and 54. The low frequency contour 53 is obtained when the resistor 44 is adjusted such that only a minimal amount of the low frequency inverted feed back signal is supplied to the input terminal 37 of the amplifier 40 and the low frequency contour 54 is obtained when the resistor 44 is adjusted such that a substantial portion of the low frequency feedback signal is supplied to the input terminal 37 of the amplifier 40.

From the amplifier 40, the equalized voltage signals are supplied through a capacitor 56 and a variable resistor 58 to a common emitter amplifier 60 which provides voltage gain. The overall gain is adjusted by suitable adjustment of the resistor 58 as is understood in the art. The output terminal of the amplifier 60 is directly coupled to the base input terminal of an emitter follower circuit 62 which provides a low impedance output.

From the emitter follower 62 of the 70-phon equalizing circuit 16, the equalized signals are coupled through a conductor 63 to the input terminals of eight octave band filter circuits 64a, 64b, 64c, 64d, 64e, 64f, 64g and 64h which separate the normalized voltage signals into frequency bands covering the entire audio range. Specifically, the filter circuit 64a is responsive to signals having frequencies between 20 and 125 Hz, the filter circuit 64b is responsive to signals having frequencies between 125 and 250 Hz, the filter circuit 64c is responsive to signals having frequencies between 250 and 500 Hz, the filter circuit 64d is responsive to signals having frequencies between 500 and 100 Hz, the filter circuit 64e is responsive to signals having frequencies between 1,000 and 2,000 Hz, the filter circuit 64f is responsive to signals having frequencies between 2,000 and 4,000 Hz, the filter circuit 64g is responsive to signals having frequencies between 4,000 and 8,000 Hz, and the filter circuit 64h is responsive to signals having frequencies between 8,000 and 20,000 Hz. It can be seen that by reason of the normalization of the voltage signals provided by the filter circuit 22 and the tone control circuit 34 of the 70-phon equalizing circuit 16, frequency bands of signals corresponding to bands of sound of equal loudness are provided as separate output signals having equal amplitudes.

The separated octave band signals are thereupon supplied through capacitors 66—73, respectively, to combined rectifier and linearizing networks 74—81, respectively As will be explained in detail hereinbelow, the accurate addition of the octave band signals to provide an indication of loudness is dependent upon linear rectification of the separated signals, and, thereafter, the linear addition of the signals. The rectifier and linearizing networks 74—81 comprise the same components so that only one of the networks, network 74, is described in detail. The network 74 comprises a doubling rectifier circuit including diodes 74a and 74b, preferably of the copper-oxide type. As is understood in the art, the current-voltage curve in the forward direction for all conventional rectifiers, particularly for small signals, is nonlinear over a portion of its usable characteristic. Accordingly, following rectification by the diodes 74a and 74b, the equalized signals are nonlinear.

These rectified and nonlinear signals are then supplied across a capacitor 74c and through a resistor 74d to a linearizing network comprising a shunt resistor 74e in series with a pair of diodes 74f and 74g, also preferably of the copper-oxide type. Because of the diodes 74f and 75g, the resistance of the linearizing network is also nonlinear, the resistance of the diodes decreasing exponentially with increased forward voltage as is understood in the art. Accordingly, the voltage loss in the linearizing network at low voltage levels is less than at high voltage levels. This results in some voltage diminution but has the advantageous effect of linearizing the transfer characteristic of the rectifier and linearizing circuit 74. In addition, the employment of the same type diodes for both rectification and linearization assures close matching of both the nonlinearity and temperature characteristics of the diodes.

The output terminals of the rectifier and linearizing networks 74—81 are connected together through a plurality of resistors 82—89, respectively, by a common conductor 90. Preferably, the resistors 82—89 have the same values. The conductors 90 connect the rectified and linearized signals to an inverting input terminal 92 of the operational amplifier 93. The output terminal 94 of the operational amplifier 93 is coupled to a wave shaping or ballistics shaping network 96 and is also coupled back to the inverting input terminal 92 through a variable feedback resistor 98. As is understood in the art, the operational amplifier 93 adds linearly such that an output voltage signal which is proportional to the sum of the linear voltage signals developed by the networks 74—81 is delivered at the output terminal 94. With the variable resistor 98 set to equal the value of the resistors 82—89, the operational amplifier acts as a one-to-one inverter with respect to each input provided that the amplifier gain is high. To provide DC gain to the linearly summed signal, the variable resistor 98 may be set to a value which is greater than the value of each of the resistors 82—89, as is understood in the art.

As more fully described in their above-mentioned article "Researches in Loudness measurement," it has been discovered through extensive testing that the loudness level of N equally loud octave bands of noise heard simultaneously is 20 log N db. greater than the loudness level of each band. It is on this basis that the rectified and linearized octave band voltage signals are linearly added by the operational amplifier 93. During their experimentation, the inventors observed that the loudness level of four equal loudness bands heard simultaneously and measured by loudness balance techniques had to be lowered by about 12 or 13 db. to balance against the sensation of loudness of a single band. The direct addition of four rectified octave band voltage signals is 20 log 4=12 db. This, along with the other experimental data discussed in the above-mentioned article, confirms the validity of the linear addition of the separated and rectified signals by the operational amplifier 93.

The amplifier 93 is also provided with a noninverting input terminal 99 which receives a temperature dependent voltage signal from a variable voltage source 100. This compensating voltage signal is provided to compensate for the temperature variation in the voltage drop occurring across a pair of series-connected diodes 102 and 104 in the ballistics shaping network 96 to which the linear sum signal produced by the amplifier 93 is supplied. As can be appreciated, this enables the monitor to provide an accurate indication of the loudness level notwithstanding any variations in temperature within the monitor.

In the ballistics shaping network 96, the signals are coupled through the diodes 102 and 104 to a shunt resistor 106 and a capacitor 108 interposed between the diode 104 and another resistor 110. From the ballistics shaping network 96, the modified sum signals are supplied to an indicating instrument 112 having a graduated and nonlinear loudness indicator scale 114 which corresponds to the scale on a conventional volume indicator. Specifically, the scale has graduations numbered from −20 to +3 db. The meter is operated in conjunction with the attenuator 11, the loudness level indication provided by the meter 112 being added to or subtracted from the reading provided by the attenuator 11, as is conventionally practiced. The scale 114 is nonlinear because of the nonlinearity introduced into the monitor by the diodes 102 and 104.

The ballistics shaping network 96 is provided to force the overall ballistic characteristics of the indicator to correspond to experimentally determined values for the human ear. These characteristics were determined with the aid of a psychoacoustic test team and the results are summarized in the table of FIG. 4.

In these tests, pulsed sounds were presented to the test panel for comparison against a comparison tone having a pulse width of 900 milliseconds at a pressure level of 70 db. Initially, the 900 millisecond pulse was presented to the panel in order to establish the loudness of the comparison tone. Then, a 50 millisecond pulse of equal intensity was presented to the test panel. The intensity of this pulse, in the judgment of the test panel, had to be raised 6.3 db. to equal the loudness level of the 900 millisecond pulse.

Next, two 50 millisecond pulses, spaced apart by 50 milliseconds, were presented to the test panel. The loudness levels of these two pulses was found to be 4.3 db. less than the loudness level of the 900 millisecond pulse. When between four and ten closely spaced 50 millisecond pulses were presented to the panel, the loudness levels in the judgment of the panel were, on the average, 1 db. greater than the loudness level of the 900 millisecond pulse.

In the next series of tests, repeated 50 milliseconds pulses, spaced apart by increasing intervals of time, were presented to the test panels. According to the judgment of the panel, as the separation between the repetitive pulses was increased, the loudness level decreased until, for a separation of 600 milliseconds between pulses, the level almost approximated that of a single 50 millisecond pulse. The effect illustrated in the table of FIG. 4 is simulated electrically by the choice of a suitable attack and decay time for the loudness level indicator. A 100 millisecond attack time and a 500 millisecond decay time produce the desired effect.

An attack time of 100 millisecond means that, if presented with a step function stimulus, the element being stimulated will have responded to 63 percent of its ultimate response at the end of 100 milliseconds. Similarly, the decay time can be analyzed in complementary terms. That is, a continuous tone reference amplitude is interrupted for a measured time interval and the effect on response is analyzed.

Three separate elements contribute to the overall ballistics behavior of the indicator. The first element comprises the rectifier and linearizing circuits 74—81. The attack time in the circuit 74, which is typical of the remaining circuits 75—81, is determined by the capacitor 74c and its associated charging resistance which is the forward resistance of the diodes 74a and 74b together with the output impedance of the filter 54 and, for the values of the components to be given hereinafter, is approximately 20 milliseconds. The decay time is controlled by the value of the storage capacitor 74c and its associated discharge path which includes the back resistance of the diodes 74a and 74b in parallel with the impedance comprising the resistor 74d which is in series with the parallel combination including the resistor 82 and the resistor 74e in series with the diodes 74f and 74g of the linearizing network. For the values of the components, hereinafter provided, the decay time is approximately 200 milliseconds.

The second element which contributes to the ballistics behavior or the indicator comprises the electromechanical time constants of the meter 112, which, as mentioned above, may be of the conventional volume indicator type. The time constants of the meter 112 are determined by the moving masses of the meter, that is, the pointer and coil, and the restoring force and friction components of the meter. Also contributing are the electrical parameters of the meter which are the coil inductance and resistance as well as the damping resistance which shunts the coil. Preferably, the meter 112 is critically damped and the attack and decay time constant are each approximately 100 milliseconds.

The third element is the ballistics shaping network 96. As above-mentioned, the network 96 is designed to force the overall ballistic characteristics of the indicator to correspond to the experimentally determined values of 100 milliseconds for the attack time and 500 milliseconds for the decay time. The attack time is determined by the capacitor 108, the resistor 106, the forward resistance of the diodes 102 and 104 and the output impedance of the operational amplifier 93. The decay time is determined by the capacitor 108 discharging through the parallel combination of the resistor 106 in series with the diodes 102 and 104 and the resistor 110 in series with the impedance of the meter 112. The values of these components in the ballistics shaping network 96 are selected such that the overall ballistic characteristics correspond to the characteristics of the average human ear. Specifically, the network 96 integrates the linear sum signal produced by the amplifier 93 such that the combined wave shaping in the network 96 and the rectifier and linearizing circuits 74—81 compensates for the rise time and decay time of the meter 112.

In operation, AC voltage signals corresponding to the broadcast are attenuated by a predetermined amount by the attenuator 11 and then supplied to the 70-phon equalizing circuit 16. The attenuator 11 is adjusted to maintain the indicating arm of the meter 112 on the scale 114 and to prevent pegging of the indicating arm when either very low loudness level sounds or very high loudness level sounds are received. The 70-phon equalizing network 16 provides the transfer characteristic shown by the solid line in FIG. 3 which is the inverse of a 70-phon equal loudness contour representative of the loudness levels of broadcasting sounds from about 60-phons to about 80-phons. This network normalizes the signals in the different frequency bands such that bands of signals corresponding to bands of sound of equal loudness are provided as output voltage signals having equal amplitudes.

From the 70-phon equalizing circuit 16, the normalized signals are separated into frequency bands covering the entire audio range by the eight octave band filters 64a...64h. Thereafter, the separated signals are rectified and linearized in the circuits 74...81 and supplied to a linear adder, shown in FIG. 1 as an operational amplifier 93. The amplifier 93 linearly adds the separated signals and supplies a linear sum signal through a ballistics shaping network 96 to the meter 112. The ballistics shaping network 96 is provided to force the ballistic characteristics of the loudness level monitor to correspond to the experimentally determined response of the human hearing process to impulsive sounds. Specifically, the network 96 forces the monitor to have an overall attack time constant of 100 milliseconds and a decay time constant of 500 milliseconds. The loudness level of the received sounds is then obtained by adding or subtracting the loudness level indication provided by the meter 112 to or from, respectively, the reading provided by the attenuator 11.

The results of tests conducted on a loudness level indicator constructed in accordance with the present invention are shown in the table of FIG. 5. In these tests, the loudness levels of typical spoken phrases and musical passages from radio programs were measured by both the loudness level indicator and by a conventional volume indicator. A psychoacoustic test team of observers was also subjected to the same broadcasting sounds and the loudness levels of the sounds indicated by the psychoacoustic test team were compared against the loudness measurements of both the indicator and volume indicator. Normal male speech was employed as the reference level. It can be seen that for a wide variety of different sounds, there is a substantial correspondence between the loudness level readings provided by the indicator of the present invention and the loudness levels of the sounds as judged by the psychoacoustic test team. By contrast, the readings provided by the volume indicator in volume units differ materially in many of the examples from the loudness levels of the sounds as judged by the test team of observers.

As has been described earlier, filter network 22 in combination with tone circuit 34 provides a transfer function inversely proportional to an equal loudness contour in the range of loudness level corresponding to normal broadcast reception in the home; i.e., in the range of 60—80-phons. However, the loudness level meter can be modified to measure loudness levels of complex sounds over a very broad range of levels by providing a self-adaptive equalizing circuit that will adjust the contour to any desired range of sounds.

Figure 6:
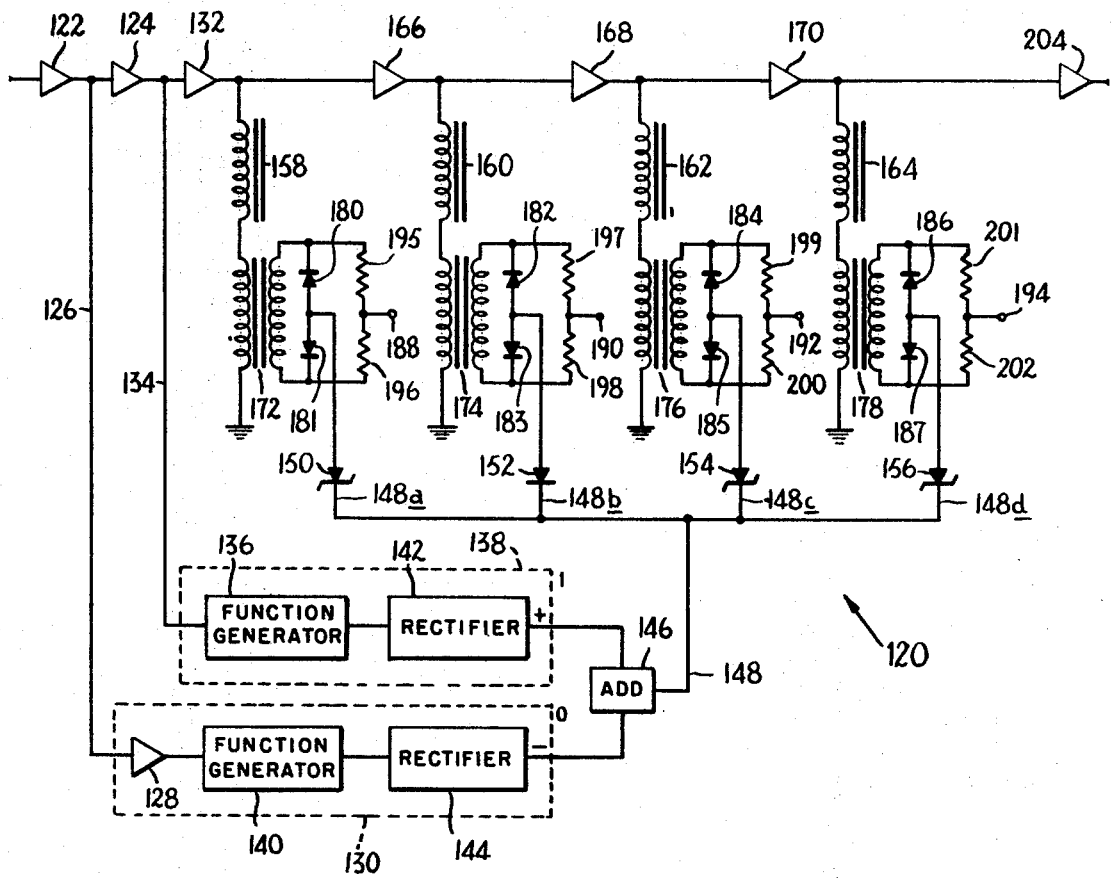
FIG. 6 is a schematic block diagram of an alternative embodiment of an equalizing circuit for the loudness level indicator of FIG. 1.

Referring to FIG. 6, there is represented a schematic block diagram of an automatically variable equalizing circuit 120 to replace the equalizing circuit 16 in the loudness level indicator of FIG. 1, where the loudness levels of sounds outside the 60—80-phon range are to be measured. The circuit 120 has an automatically variable transfer function inversely proportional to loudness contours in the 0—120-phon range, as will be described in detail hereinbelow.

Attenuated signals supplied from the stepped attenuator 11 (FIG. 1) are coupled to an amplifier 122 comprising the first circuit of the equalizing circuit 120. From the amplifier 122, the amplified signals are coupled to a second amplifier 124 and through a conductor 126 to an amplifier 128 in a first control circuit 130. The signals amplified by the amplifier 124 are coupled to a third amplifier 132 and through a conductor 134 to a function generator 136 in a second control circuit 138. A function generator 140 is also provided in the first control circuit 130 and both function generators 136 and 140, which may be, for example, operational amplifiers with nonlinear feedback, are connected to a pair of full wave rectifiers 142 and 144, respectively.

Each function generator operates over a 50 db. signal range, the range for the generator 136 being 20—70 db. and the range for the generator 140 being 70—120 db. At a signal level of 20 db., the generator 136 supplies a maximum negative output voltage signal. As the level increases to a maximum of 70 db., the amplifier of the output voltage signal decreases to a selected minimum. At a signal level of 70 db., the function generator 140 becomes operative to supply a positive voltage signal. The amplitude of the positive output signal increases to a maximum as the amplitude of the input signal increases.

An adding circuit 146 coupled to the rectifiers 142 and 144 adds the negative and positive signals produced by the generators 136 and 140 and supplies a sum or control signal through a conductor 148 and branch conductors 148a, 148b, 148c and 148d to the cathodes of four Zener diodes 150, 152, 154, and 156, respectively. Preferably, the generators 136 and 140 are adjusted such that at an input signal level of approximately 100 db. the two signals produced by the generators cancel each other out in the adding circuit 146.

The response of the equalizing circuit 120 is achieved by varying the effectiveness of four shunt inductors 158, 160, 162 and 164, respectively, coupled together by three amplifiers 166, 168 and 170. The inductors 158, 160, 162 and 164 are returned to ground through the primary windings of four transformers 172, 174, 176 and 178, respectively. The secondary windings of the transformers are coupled to vario-losser networks consisting of matched silicon diodes 180, 181; 182, 183; 184, 185; and 186, 187 respectively. It may be noted that by varying the DC current through the diodes in the forward direction, large changes in impedance can be obtained with relatively small changes in DC current. The effects of the variable impedances are reflected back into the primary windings of the transformers 172, 174, 176 and 178. Consequently, the low frequency attenuation of the networks comprising the inductors 158, 160, 162 and 164 is varied depending upon the conductivity of the diodes 180, 181; 182, 183; 184, 185; and 186, 187.

The cathodes of the diodes comprising the vario-losser networks are coupled back to sources of DC potential 188, 190, 192 and 194, respectively, through resistors 195, 196; 197, 198; 199 200; and 201, 202. The anodes of the diodes comprising the vario-losser networks are coupled together and to the anodes of the Zener diodes 150, 152, 154 and 156, respectively. By employing the Zener diodes in the path of the DC control signal produced by the adding circuit 146 and by returning each vario-losser diode pair to a DC potential, each diode pair can be exclusively operated at a different point along the range of control voltage, i.e., from a maximum negative control signal to a maximum positive control signal. In this manner, a usable attenuation-control voltage curve may be produced at any low frequency. After equalization, the signals are amplified by an amplifier 204 and supplied to the filters for frequency separation (FIG. 1).

Although the invention has been described herein with reference to a specific embodiment, many modifications and variations therein will readily occur to those skilled in the art. For example, although the invention has been described in a form readily adaptable for connection to the program line of a broadcast station for measuring the relative loudness of a broadcast program, it will now be obvious that the principles may be embodied in a universal loudness level meter by equipping it with a microphone and a suitable preamplifier connected to the input terminals 10. Accordingly, all such variations and modifications are included within the intended are scope of the invention as defined by the following claims.

We claim:

1. A loudness level indicator for measuring the loudness levels of sound comprising, an input circuit for receiving signals related to sound pressure whose loudness it is desired to measure, equalizing circuit means connected to said input circuit to receive said signals, the equalizing circuit means having a transfer function inversely proportional to an equal loudness contour over the range of loudness levels of sounds represented by said signals, separating means for separating the equalized signals into a predetermined number of frequency bands, a corresponding number of rectifying means for individually rectifying the separated signals, means for arithmetically summing the rectified signals to produce a combination signal, indicating means responsive to the combination signal for providing an indication of the magnitude of the combination signal, end circuit means interposed between said summing means and said indicating means operative to shape the combination signal to conform the overall response of the indicating means with the response of the human hearing process to impulsive sounds.